Figure 1:
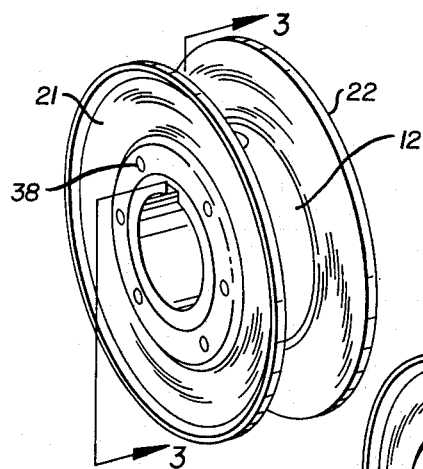

July 9, 1963  S. F. SPIRAKUS  3,096,660

SYMMETRICAL HUBBED SHEET METAL PULLEY

Filed May 19, 1961

INVENTOR.
STANLEY F. SPIRAKUS

ATTORNEYS

United States Patent Office 3,096,660
Patented July 9, 1963

3,096,660
SYMMETRICAL HUBBED SHEET METAL PULLEY
Stanley F. Spirakus, Cleveland, Ohio, assignor to Zatko Metal Products Co., Euclid, Ohio, a corporation of Ohio
Filed May 19, 1961, Ser. No. 111,274
4 Claims. (Cl. 74—230.3)

This invention relates to hubbed sheet metal pulleys comprising a hub formed from machined bar stock on which are mounted pulley flanges formed from sheet metal by stamping operations.

In forming relatively small heavy-duty pulleys of the above type, it has been common practice to provide an axially protruding hub portion in order to accept the pulley set screw without undue weakening of the pulley structure. Location of the set screw between the pulley flanges was not practical in smaller sizes of pulleys because a set screw of adequate diameter would to an impractical degree interfere with the closely spaced pulley flanges or with the joints between each flange and the hub.

Because the bar stock represents as much as 80% of material costs and the sheet metal as little as 20% of material costs, it is important to minimize the use of the former. A disadvantage of the axially protruding hub structure of the prior art is the relatively great length of bar stock required per item, the length of bar stock greatly exceeding the greatest spread between the pulley flanges. Furthermore, since the hub protrudes to one side, the pulley structure is relatively bulky and requires relatively long shaft projections for mounting. The designs are such that there is a considerable differential between the volume of each length of bar stock before and after machining, representing wasted material and relatively high machining costs.

The present invention provides a pulley structure which is relatively compact and in which all parts are located between the axial extremities of the pulley flanges. A relatively short length of bar stock is required per item and only a little material is removed from such relatively short length, thereby very significantly reducing material costs and also somewhat reducing machining costs. The pulley is axially symmetrical, so that the two sheet metal flanges may be formed as identical elements, and, with a simple jig, may be simultaneously assembled together with the hub and welded thereto thereby further reducing manufacturing costs.

The invention embodies the concept of providing a pulley formed so that the sheet metal walls have a zone of relative proximity located slightly radially outwardly of the hub portion which is formed from bar stock. The sheet metal walls are formed to flare or spread axially away from each other both in the radially outward and radially inward directions from such zone of relative proximity. The spreading in the radially outward direction is relatively gentle to form the flanges of the pulley sheave. The spreading in the radially inward direction is relatively acute or abrupt to form sockets for receiving shouldered portions of the hub. The effect is to provide an axially central great-diameter hub portion which is of an axially greater length than the minimum spacing between the flanges of the pulley sheave proper.

The advantages and features of the invention will be more readily understood from the following illustrative example thereof.

Figure 2:
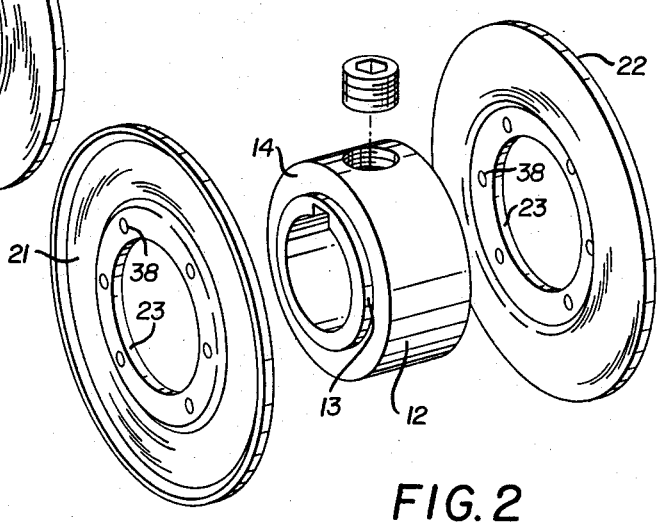
Figure 3:
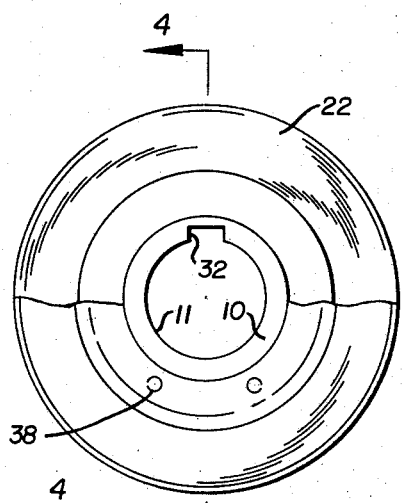
Figure 4:
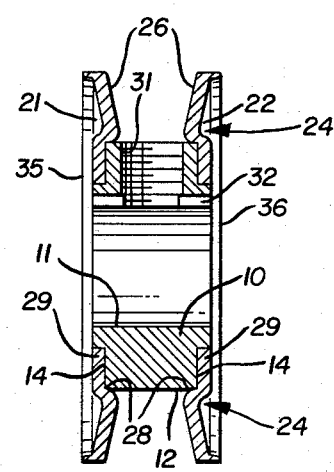

In the drawings:
FIGURE 1 is an isometric view of a pulley wheel embodying the invention.
FIGURE 2 is an exploded version of FIGURE 1.
FIGURE 3 is a view partly in section taken from the planes of line 3—3 in FIGURE 1 without a set-screw.
FIGURE 4 is a sectional view taken on the plane of line 4—4 in FIGURE 3.

The pulley shown in the drawings comprises a hub 10 having a central bore 11 and a great outside diameter 12. A reduced diameter 13 is formed at each end of the hub 10 to define a shoulder 14 at each end of the hub between the great diameter 12 and the associated one of the reduced diameters 13.

Associated with the hub 10 are a pair of sheet metal walls 21 and 22. The walls 21 and 22 are located relatively close to each other at a zone 24 which is located slightly radially outwardly of the great diameter 12. Commencing at the zone 24 the walls 21 and 22 spread axially away from each other both in the radially outward and radially inward directions. The radially outward axial spreading is relatively gentle as at 26 and forms the flanges of the pulley sheave. The radially inward axial spreading is relatively acute as at 28 to form sockets for receiving the hub shoulders 14 including the radially outermost portions thereof.

The portions of the walls 21 and 22 which are located radially inwardly of the location of the relatively acute spreading 28 are indicated by the reference numeral 29 and will be seen to have substantially no spread with relation to each other. Each of the portions 29 abuts against its associated shoulder 14.

A tapped hole 31 is provided for reception of a setscrew, the diameter of which may be almost half the total thickness of the pulley. A key slot 32 is also provided.

The inner diameter 23 (FIGURE 2) of each sheet metal wall 21 and 22 substantially coincides with the reduced diameter 13 at its associated hub end. The axial width of each of the reduced diameters 13 is substantially the same as the thickness of the sheet metal walls 21 and 22.

It will be noted that in the resulting pulley all parts are located between the axial extremities 35 and 36 of the pulley flanges. A relatively short length of bar stock is required per pulley wheel and, aside from the central bore, keyway, and set-screw hole, only the small amount of material between the shoulders 14 and the ends of the hub is removed from the original bar stock. The pulley structure is axially symmetrical so that the sheet metal walls 21 and 22 may be formed as identical elements and, with suitable simple jig structure, may be simultaneously assembled together with the hub and welded thereto as by a projection welding operation. In this connection, the small circles 38 are intended to indicate the dimples or (after welding) the depressions formed as a result of the projection welding operation.

Obviously, modifications of the invention will be apparent to those familiar with metal stamping and fabricating in the light of the above disclosure.

What is claimed is:
1. A pulley comprising a centrally bored hub having a great outside diameter, a reduced outside diameter at each end, and a shoulder at each end defined between said great diameter and the associated one of said reduced diameters, a pair of sheet metal walls which, commencing at a radially intermediate zone of relative proximity located slightly radially outwardly of said great diameter and at which zone said walls are spaced from each other, spread axially away from each other both in the radially outward and radially inward directions, said radially outward axial spreading being relatively gentle to form the flanges of the pulley sheave, said radially inward axial spreading being relatively acute to form sockets for receiving said hub shoulders including the radially outermost portions of said shoulders, with portions of said walls which are located radially inwardly of said relatively acute spreading having substantially no spread and abutting against said shoulder, a tapped set-screw hole extending radially inwardly from the great outside diameter to the central bore of said hub, said set-screw hole being located axially intermediate said sheet metal walls.

2. A pulley comprising a centrally bored hub having a great outside diameter, a reduced outside diameter at each end, and a shoulder at each end defined between said great diameter and the associated one of said reduced diameters, a pair of sheet metal walls which, commencing at a radially intermediate zone of relative proximity located slightly radially outwardly of said great diameter and at which zone said walls are spaced from each other, spread axially away from each other both in the radially outward and radially inward directions, said radially outward axial spreading being relatively gentle to form the flanges of the pulley sheave, said radially inward axial spreading being relatively acute to form sockets for receiving said hub shoulders including the radially outermost portions of said shoulders, with portions of said walls which are located radially inwardly of said relatively acute spreading having substantially no spread and abutting against said shoulder, the inner diameter of each sheet metal wall substantially coinciding with said reduced diameter at its associated hub end.

3. A pulley comprising a centrally bored hub having a great outside diameter, a reduced outside diameter at each end, and a shoulder at each end defined between said great diameter and the associated one of said reduced diameters, a pair of sheet metal walls which, commencing at a radially intermediate zone of relative proximity located slightly radially outwardly of said great diameter and at which zone said walls are spaced from each other, spread axially away from each other both in the radially outward and radially inward directions, said radially outward axial spreading being relatively gentle to form the flanges of the pulley sheave, said radially inward axial spreading being relatively acute to form sockets for receiving said hub shoulders including the radially outermost portions of said shoulders, with portions of said walls which are located radially inwardly of said relatively acute spreading having substantially no spread and abutting against said shoulder, the inner diameter of each sheet metal wall substantially coinciding with said reduced diameter at its associated hub end, the axial width of each of said reduced diameters being substantially the same as the thickness of said sheet metal walls.

4. A pulley comprising a centrally bored hub having a great outside diameter, a reduced outside diameter at each end, and a shoulder at each end defined between said great diameter and the associated one of said reduced diameters, a pair of sheet metal walls which, commencing at a radially intermediate zone of relative proximity located slightly radially outwardly of said great diameter and at which zone said walls are spaced from each other, spread axially away from each other both in the radially outward and radially inward directions, said radially outward axial spreading being relatively gentle to form the flanges of the pulley sheave, said radially inward axial spreading being relatively acute to form sockets for receiving said hub shoulders including the radially outermost portions of said shoulders, with portions of said walls which are located radially inwardly of said relatively acute spreading having substantially no spread and abutting against said shoulder, a tapped set-screw hole extending radially inwardly from the great outside diameter to the central bore of said hub, said set-screw hole being located axially intermediate said sheet metal walls, the inner diameter of each sheet metal wall substantially coinciding with said reduced diameter at its associated hub end, the axial width of each of said reduced diameters being substantially the same as the thickness of said sheet metal walls.

References Cited in the file of this patent

UNITED STATES PATENTS

| 2,641,935 | Wilken | June 16, 1953 |
| 2,646,689 | Maher | July 28, 1953 |

FOREIGN PATENTS

| 185,153 | Great Britain | Sept. 7, 1922 |